May 22, 1945.   A. R. MORLEY ET AL   2,376,445
NAVIGATION INSTRUMENTALITY
Filed Feb. 11, 1944   2 Sheets-Sheet 1
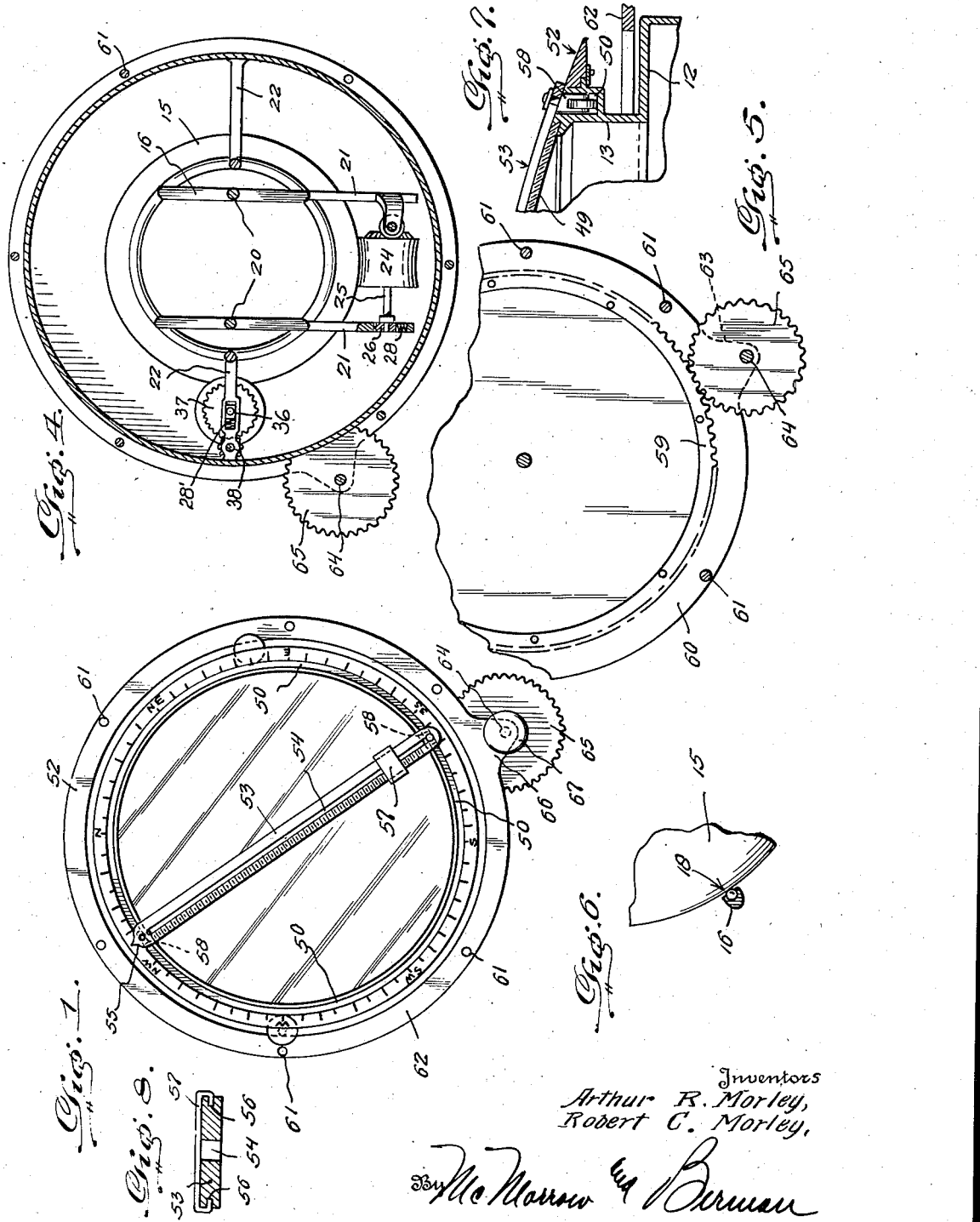
Inventors
Arthur R. Morley,
Robert C. Morley,
By McMorrow & Berman
Attorneys

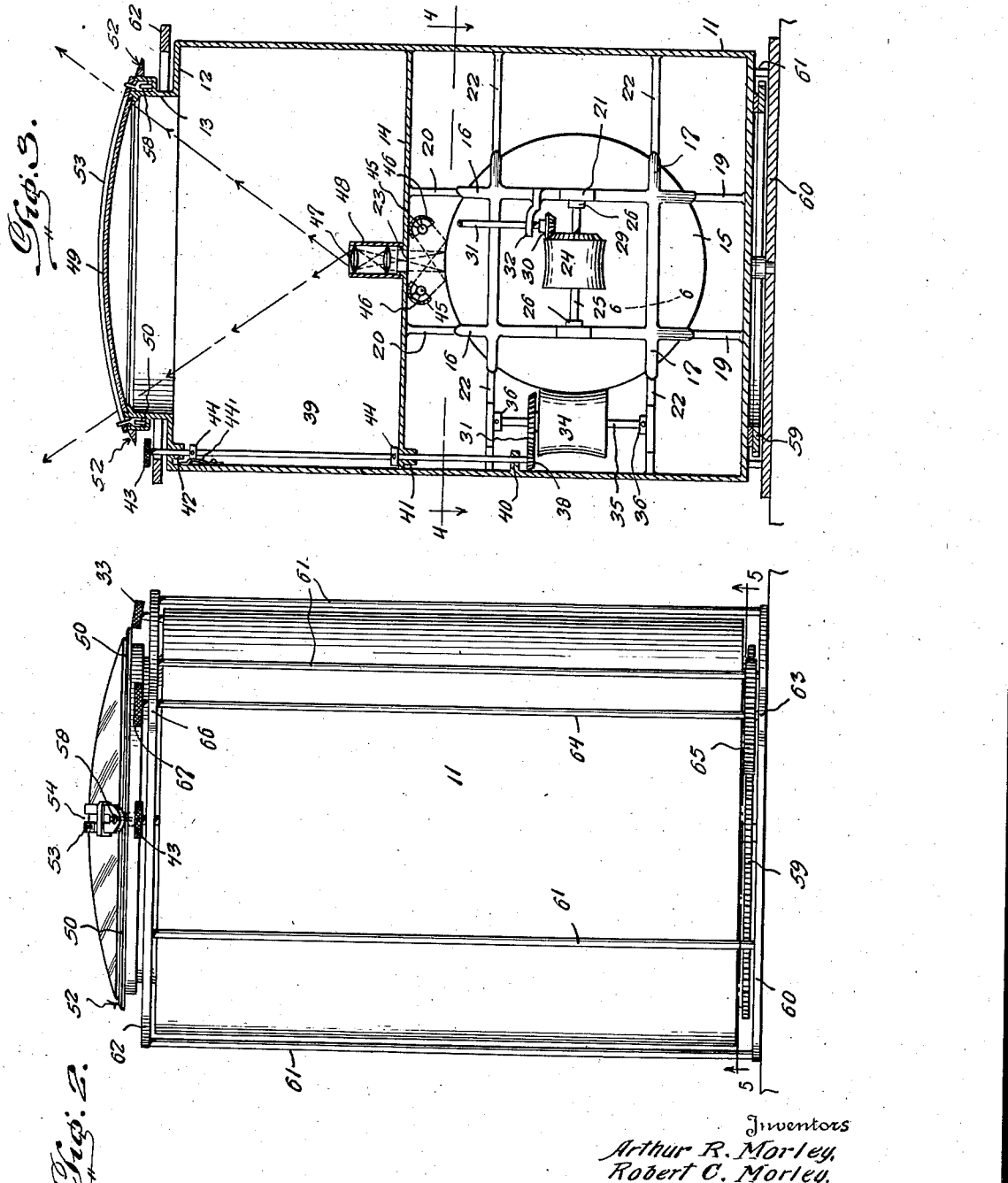

Patented May 22, 1945

2,376,445

UNITED STATES PATENT OFFICE 2,376,445

NAVIGATION INSTRUMENTALITY

Arthur R. Morley and Robert C. Morley, Youngstown, Ohio

Application February 11, 1944, Serial No. 521,988

9 Claims. (Cl. 35—46)

This invention appertains to an instrumentality for use in the navigation of air, land and water craft, and has for one of its several objects and advantages, to provide a rotatable globe type of the same, from which any given area on the earth's surface can be projected and enlarged for observation and subjected to mechanical plotting, all in a manner to greatly simplify the navigation of these craft generally, and that of aircraft in particular, and to eliminate the need for reference to, or the use of, all other charts and maps.

Another object of the invention is to provide an instrumentality of this character, which includes a rotatable globe having a three dimensional and exact representation of the earth's surface thereon, for the enlarged projection of a given portion thereof onto a curved screen, so that the projected area will be entirely free from distortion and otherwise in accurate detail to a degree not to be had from charts and maps, upon which the curvature of the earth's surface is represented as a flat plane.

A further object of the invention has to do with the provision of a novel mechanical means, cooperatively mounted relatively to the rotatable globe and the projection screen associated therewith, in the use of which, the position, for instance, of an airplane can be easily and readily plotted.

With these and other objects and advantages of equal importance in view, the invention resides in the certain new and useful combination, construction and arrangement of parts, as will be hereinafter more fully described, set forth in the appended claims, and illustrated in the accompanying drawings, in which:

Figure 1 is a top plan view of the navigation instrument, in accordance with the invention;

Figure 2 is a side elevation thereof;

Figure 3 is a vertical, diametrical, section through the casing, showing the chart-image projection system in section and the globe and its rotative mechanism in elevation;

Figure 4 is a horizontal section, taken on the line 4—4 of Figure 3.

Figure 5 is a fragmentary, horizontal section, taken on the line 5—5 of Figure 2, looking in the direction of the arrows;

Figure 6 is a fragmentary, sectional detail, showing the ball bearing ring support of the globe.

Figure 7 is an enlarged sectional detail, showing the slotted end of the plotting rule and its trolley mounting; and Figure 8 is an enlarged detail of the plotting rule, showing the mounting of the slide indicator thereon.

Referring to the drawings, wherein like characters of reference denote corresponding parts in the several views, the embodiment of the invention, as it is exemplified therein, is generally comprised in a globe; a lensing system for the projection, in enlarged dimensions, of a chart-image of a given area of the representation of the earth's surface represented on the globe circumference; a receiving screen, preferably of convex form; an illumination system for the lensing system; a controlled rotative mechanism for the globe; and a protective casing for enclosing these components, either wholly, or in part.

The globe 15 is in the form of a hollow sphere and has its circumference provided with a graphic representation of the earth's surface, with its land and water areas depicted in appropriate colors. For the purpose of aerial navigation, the globe 15 will preferably be made to a size having a diameter of 13.758 inches, and provided with an abundance of highly condensed geographical data and navigational information and so scaled that 1 inch corresponds to 500 nautical miles on the earth's surface.

The globe is mounted for rotation in North-South and East-West, or vice versa, directions within a frame comprised in two pairs of rings 16 and 17, which are joined together in a manner that they intersect each other and form four 90 degree angles about each point of intersection. These rings 16, 17, each carry ball-bearings 18 (Figure 6) in contact with the surface of the globe 15, to reduce friction to a minimum. This globe and ring-frame assembly is positioned within the lower part of the casing 15, below a horizontally disposed division wall or partition 14, the upper end of the casing being open through an annular flange 13 upstanding from the inner edge of another annular flange 12, inturned from its side wall.

This ring-frame is centered within the lower compartment of the casing 15, with the rings 16 disposed vertically and the rings 17 horizontally thereof, to which end, it is rigidly supported on elements or posts 19, rising from the bottom wall of the casing, and between the same and like elements or arms 20, depending from the division wall or partition 14, which elements connect the rings 16 at points located diametrically thereof. Extending radially and horizontally from one side of the rings 16, in 90 degree angular relation to the elements 19, 20, are other elements or arms 21, which may, or may not, be secured to the side wall of the casing. Similarly, the rings 17 are provided with horizontally disposed elements or arms 22, which extend radially in opposite directions diametrically thereof for securement to the side wall of the casing 15.

The globe 15 is rotatable to selected positions, in directions north-south and east-west, or vice versa, through the medium of similar but separate mechanisms, with reference to an aperture 23, formed centrally in the division wall or partition 14. The mechanism for controlling the north-south and south-north directions of rotation of the globe, is comprised in a cylindro-conic roller 24, that is keyed on a horizontal shaft 25, which has its ends journaled in bearings 26 slidably mounted in slotways 27, formed longitudinally in the arms 21. Housed within the slotways 27 are springs 28, which act, through the bearings 26 and the shaft 25, to normally withhold the roller 24 from frictional driving contact with the surface of the globe. Also mounted on the shaft 25, is a bevel gear 29, which is adapted to be meshed with a bevel pinion 30, that is keyed on the lower end of a shaft 31 extending upwardly within the casing 15, through the division wall or partition 14, and outwardly of the flange 12, of the neck portion of the casing. The lower end of the shaft 31 is journaled in a bearing bracket 32 secured to the ring-frame and has its upper end provided with a knurled operating dial 33.

The mechanism for the east-west and the west-east directions of rotation of the globe 15, is comprised in another cylindroconic roller 34, the axis of which is disposed at right angles to that of the roller 24 and is constituted in a vertical shaft 35, that has its ends journaled in bearings 36, which are slidably mounted in slotways formed longitudinally in the arms 22, at one side of the ring-frame. Here, too, the slotways house springs 28' (Figure 4) that are cooperative with the bearings 36, after the manner of the springs 28 with the bearings 26, for normally withholding the roller 34 out of contact with the surface of the globe 15. Mounted on the shaft 35, is a spur gear 37, which is adapted to be meshed with a pinion 38, keyed on the lower end of a shaft 39, that extends upwardly within the casing, after the manner of the shaft 31. The lower end of the shaft 39, immediately above the pinion 38, is journaled in a bearing bracket 40, secured to the side wall of the casing, while an intermediate portion is journaled in a bearing 41, mounted in the division wall or partition 14, and a portion of its upper end in a bearing 42, similarly mounted in the flange 12. The free end of this shaft 39 is also provided with a knurled operating dial 43.

The rollers 24, 34, are released from contact with the surface of the globe 15 whenever the pinions 30, 38, are moved out of meshing engagement with the gears 29, 37, and they will effectively lock the globe in a set position, whenever both pinions are meshed therewith at the same time. In order to move the pinions 30, 38 into and out of engagement with the gears 29, 37, the shafts 31, 39, are each adapted for manipulation to that end from the operating dials 33, 43, respectively. As best shown in Figure 3, the shaft 39 is arranged for vertical movement, within the limits imposed by a pair of collars 44 keyed thereon, one immediately above the bearing 41 and the other slightly spaced below the bearing 42, and is elevated to lift the pinion 38 from its meshing engagement with the gear 37 by an upward pull on the dial 43. Upon release of the dial 43, the pinion 38 will be withheld from such engagement by the pressure of a spring 44' on the upper of the collars 44, until the dial 43 is again depressed, the spring 44' being supported on the side wall of the casing 11. The shaft 31 will be similarly arranged and equipped for the movement of the pinion 30 into and out of mesh with the gear 29, following each setting of the globe 15 with reference to the aperture 23 in the division wall or partition 14.

For obtaining the stated directional movements of the globe 15, and as illustrated, the roller 24 is mounted horizontally at the front central side of the globe, and the roller 34 vertically at the left central side thereof, and by a proper manipulation of the dials 33, 43, any given area of the earth's surface, as depicted on the surface of the globe may be placed in registry with the aperture 23 in the center of the division wall or partition 14, for projection therethrough. In order to accomplish this projection, a circular battery of electric lamps 45 is mounted on the lower side of the division wall or partition 14 about the aperture 23, and they are housed within an annular reflector 46 designed to concentrate the light on that portion of the globe that is visible through the aperture for its unobstructed reflection from the surface of the globe upwardly through the aperture, and, for present purposes, the aperture 23 will be circular and have a diameter of one (1) inch, so that the circular area of the globe that is visible therethrough will be of approximately the same diameter.

To project a chart-image of a selected area of the globe 15 brought into registry with the aperture 23, a lensing system is provided and it is mounted on the upper side of the division wall or partition 14 in centered relation to the aperture to receive the light rays reflected from the globe surface. The system is made up of suitable lenses 47, preferably with a magnifying power of twenty (20) diameters, enclosed within a tube 48 of proper dimensions, with its lower end secured about the edge of the aperture 23 in a manner to prevent light leakage. The chart-image to be projected by this lensing system is received on a circular translucent screen 49 that is fitted within the upper end of the upstanding flange 13 of the neck portion of the casing 11. The screen 49 may be of either the SA or the SB type and, while both are essentially the same, except that the SA type is concavo-convex and the SB type flat, the SA type is preferred for present purposes. The screen 49, therefore, takes the form of a segment of a hollow sphere and, to accord with the other dimensions given herein, has an arc length of twenty (20) inches.

Encircling the flange 13, at the edge of the screen 49, is a trackway 50 which, in turn, is encircled by an azimuth ring 52, i. e., a circular ring, calibrated into 360 degrees and provided with the cardinal direction points. The trackway 50 may take the form of a circular ring secured about the edge of the flange 13, with a channel in its upper side and an outwardly directed flange 51 upon which the azimuth ring 52 is mounted for circular turning motion. Mounted on the upper side of the screen 49, diametrically thereof, is a transparent plotting rule 53, twenty (20") inches in length and curved to the same curvature as the screen, with its ends convexed to match the curvature of the screen margin. The surface of the rule is calibrated into corresponding miles and has a center slit 54 extending lengthwise to within one (1") inch of each end, where a straight line 55, constituting an index, extends outward to the rule end for cooperation with the azimuth-ring. The opposite side edges of the rule 53 are grooved, as at 56, to receive lateral trolleys at the ends of a slide-indicator 57 which is preferably rectangular in form and made of a transparent material. The ends of the rule 53 are pivoted to wheeled trolleys 58, that are engaged in the channel of the trackway 50, for its angular adjustment relatively to the screen margin.

The casing 11 is formed of an opaque material and is mounted on a ring gear 59, which, in turn, is mounted for rotative motion on a circular base 60. Rising from the base 60, in spaced relation about the casing, are a series of struts 61 which support a circular member 62 at their upper ends. This member 62 is engaged over the flange 13 and has a width to partially overlie the flange 12, substantially as shown in Figure 3. The base 60 is provided with a lateral offset 63 to give bearing to the lower end of a shaft 64 which carries a gear 65 arranged in mesh with the ring-gear 59. Likewise, the circular member 62 is provided with an offset 66 having an aperture for the projection of the shaft 64 upwardly through the same, the projected shaft end having a control knob 67 for its manipulation. A locking means (not shown) will be provided to secure the casing 11 in any of its positions of angular adjustment relatively to the base.

In operation, with the instrument installed on an airplane, and before departure, the illuminating system 45 will be energized and the globe 15 is rotated from the control knobs 33, 43, to place a given area of its surface in registry with the aperture 23, for the projection of that area, by the lensing system 47, onto the screen 49. The globe 15 is then locked in its set position by pushing downwardly on both of the dials 33, 43, to mesh the pinions 30, 38, with the gears 29, 37. Following this, the chart-image on the screen 49 is oriented by aligning the magnetic azimuth, projected by that portion of the globe surface, with a compass. This is accomplished by rotating the casing 11, through the meshing gears 59, 65, from the operating dial 67, until the required alignment is obtained, when the casing will be locked in its set position. With this setting of the casing, the azimuth ring 52 is turned about the flange 13 so that its north indication is in alignment with true north on the chart-image and it is then locked in set position.

With the instrument thus conditioned, the course, to be followed in the flight of the airplane, is plotted by, first, drawing a line, with erasable crayon, on the screen over the chart-image, from the point of departure to and through the destination point to the outside margin of the screen. Here, the index 55 indicates a degree-mark on the azimuth ring 52. Now, the plotting rule 53 is placed over the drawn line for its registry with the slit 54 and the slide-indicator 57 is thereafter moved to a position where its forward margin is in registry with the point of departure. With the airplane in flight, the slide-indicator 57 is moved along the rule 53 correspondingly with the ground speed of the airplane and, whenever drift occurs, the rule 53 is moved the proper number of degrees, its forward end with reference to the azimuth-ring 52, to the left or right of the drawn line, as the case may be, and is moved back to its original position as the drift is corrected. If allowance is made for the drift, the rule 53 is moved the number of degrees-of-allowance to the left or right of the drawn line and thereafter is moved back towards its original position as the airplane is shifted by the drift wind. Measurement of the distance to move the rule in degrees is determined on the azimuth ring scale and the point of departure on flight is always the point of pivot of the rule 53 in its shifting movement for determining the angle of drift, or points lying along the flight course. The position of the airplane, in relation to the earth's surface, is the point indicated by the intersection of the slit 54 in the rule and the forward margin of the slide-indicator 57 over the chart-image. The provision of the elongated slit 54 in the rule, makes possible the drawing of lines and angles, or the marking of points along the flight course, by inserting a crayon-pencil through it. The sides of the rule 53 may, of course, be used as a straight-edge for drawing lines and the making of calibrations used to measure distances.

Considering certain details of the invention, not previously touched upon herein, it is to be noted that the rollers 24, 34, will preferably be made of a material, such as rubber or the like, which will afford effective frictional contact of their peripheries with the surface of the globe 15, in order that extreme accuracy in adjustment of the globe, with reference to the projection aperture 23 be had. Also, that the lensing system to be employed has a double inversion effect, so that the chart-image projected thereby onto the screen 49 will be erect and all points in their proper positions. The purpose of considering both types of screens is that each has its particular advantage. With the curved screen, the SA type, an exact representation of the earth's surface can be projected onto it, since the image is reflected from a convex-curved surface, i. e., the globe 15, and is received on a concavo-convex-curved screen which is concentric to the globe. In the case of the flat screen, the SB type, the projection is of the Mercator variety, since the image reflected from the convex-curved surface of the globe is received on a flat screen, when a slight distortion will naturally result. This distortion, however, is negligible, and this type of screen is of course easier to plot on than it is on the SA type. In either case, the screen employed, as before stated, is translucent, so that the chart-image is to be viewed from its outer surface in the same form as it appears on the surface of the globe. Of course, if a flat screen is employed, the rule 53 will likewise be flat.

Having thus fully described our invention, it is to be understood that various changes in design and in minor details of construction and arrangement of parts may be resorted to, without departing from the spirit of the invention, or its scope as claimed.

What we claim is:

1. In a device of the class described, a casing having an opening, a translucent projection screen closing the opening, a lensing system positioned within the casing behind the screen and centered with respect thereto, a globe having a map of the earth depicted on its surface mounted for directional rotative movements within the casing behind the lensing system, and means within the casing for illuminating a given area of the globe surface for the reflection of a chart image of the illuminated area therefrom, to, and through, the lensing system and onto the screen.

2. The device as in claim 1, with the casing mounted within a supporting frame and means carried by said frame for rotating said casing in relation thereto for the orientation of the chart image projected onto the screen with respect to the magnetic azimuth, by means of a compass.

3. The device as in claim 1, with mechanisms within the casing for effecting directional rotation of the globe relative to the lensing system, and control means exteriorly of the casing for operating the mechanisms.

4. The device as in claim 1, with a partition dividing the interior of the casing into compartments, and having a projection aperture centered therein, the lensing system being mounted on one side of the partition at the aperture and the globe and the illuminating means therefor at the opposite side of said partition, said illuminating means being carried by the partition about said aperture.

5. The device as in claim 1, with the projection screen of convex form, concentrically disposed with respect to the curvature of the globe, the lensing system and said illuminating means, having an area substantially greater than the said screen illuminated area of the globe.

6. The device as in claim 1, with a degree scaled azimuth-ring rotatively mounted on the casing about the margin of the projection screen for turning movements to position its North indication in alignment with the True North of the chart-image projected onto the screen.

7. The device as in claim 1, with a transparent plotting rule, scaled longitudinally with mile graduations, mounted on the casing and extending across the projection screen, the rule being angularly adjustable relatively to margin of the screen for the plotting of flight direction of an airplane on the screen, relatively to the chart image projected thereon.

8. The device as in claim 1, with a trackway supported on the casing and encircled about the margin of the projection screen, a degree scaled azimuth ring also supported on the casing and encircled about the trackway for turning movements about the same, relatively to the margin of the projection screen, a trolley movable on the trackway, and a transparent plotting rule, scaled longitudinally with mile graduations, extending across the projection screen and having one end pivoted to the trolley for its angular adjustment relatively to the margin of the screen and the azimuth ring.

9. In a device of the class described, a casing open at its upper end, a translucent projection screen closing the opening, a globe having a map of the earth depicted on its surface mounted for directional rotative movements within the casing, means within the casing for projecting a chart image of a given area of the map onto the screen, a trackway supported on the casing and encircled about the margin of the screen, a degree scaled azimuth ring also supported on the casing and encircled about the trackway for turning movements relatively to the margin of the screen, a trolley movable on the trackway, a transparent plotting rule, scaled longitudinally with mile graduations, extended across the screen and having one end pivoted to the trolley for its angular adjustment relatively to the margin of the screen and the azimuth ring, and an indicator slide mounted on the rule relatively to the mile graduations thereon, the rule being longitudinally slitted at its center and between its ends for the insertion therethrough of a crayon-pencil for the delineation on the screen surface of the course of flight of an airplane.

ARTHUR R. MORLEY.
ROBERT C. MORLEY.